United States Patent [19]
Davis et al.

[11] Patent Number: 5,671,335
[45] Date of Patent: Sep. 23, 1997

[54] PROCESS OPTIMIZATION USING A NEURAL NETWORK

[75] Inventors: Gerald Wesley Davis, Franklin; Michael L. Gasperi, Caledonia, both of Wis.

[73] Assignee: Allen-Bradley Company, Inc., Milwaukee, Wis.

[21] Appl. No.: 707,191

[22] Filed: Jan. 3, 1994

Related U.S. Application Data

[63] Continuation of Ser. No. 18,904, Feb. 8, 1993, abandoned, which is a continuation of Ser. No. 704,766, May 23, 1991, abandoned.

[51] Int. Cl.$^6$ .................................................. G06F 15/18
[52] U.S. Cl. ................................................ 395/23; 395/24
[58] Field of Search ........................................ 395/23, 24

[56] References Cited

U.S. PATENT DOCUMENTS

| | | | |
|---|---|---|---|
| 3,950,733 | 4/1976 | Cooper et al. | 395/24 |
| 4,918,618 | 4/1990 | Tomlinson, Jr. | 395/23 |
| 5,052,043 | 9/1991 | Gaborski | 395/22 |
| 5,056,037 | 10/1991 | Eberhardt | 395/24 |
| 5,107,454 | 4/1992 | Niki | 395/24 |
| 5,129,039 | 7/1992 | Hiraiwa | 395/24 |

OTHER PUBLICATIONS

"Neural Networks, Part 2" Wasserman et al, IEEE Expert 1988.

*Supervised Learning And Systems With Excess Degrees of Freedom*, pp. 5,6, Michael I. Jordan, Massachusetts Institute of Technology, May 1988.

*Neural Networks for Control*, pp. 34–37, W. Thomas Miller, III, et al. Massachusetts Istitute of Technology, 1990.

Neural Networks For Control edited by W. Thomas Miller et al.

Chapter 1 of Applied Optimal Control by Arthur E. Bryerson et al.

Neurocontrol And Fuzzy Logic: Connections and Designs by Paul J. Werbos.

Generic Constraints On Underspecified Target Trajectories by Michael I. Jordan.

Neurocontrol and Related Techniques, Chapter 22, by Paul J. Werbos.

*Primary Examiner*—George B. Davis
*Attorney, Agent, or Firm*—Keith M. Baxter; John M. Miller; John J. Horn

[57] ABSTRACT

An input to a complex multi-input process, such as injection molding, is optimized to produce a target output from that process through the use of a neural network trained to that process. A trial input is forward-propagated through the neural network and the output of the network compared to the target output. The difference is back-propagated through the network to determine an input error value in the network. This error value is used to correct the trial input. This correction process is repeated until the trial input produces the target output to within a predetermined degree of accuracy.

6 Claims, 7 Drawing Sheets

PROCESS OPTIMIZATION USING A NEURAL NETWORK

This application is a continuation of application Ser. No. 08/018,904, filed Feb. 8, 1993, now abandoned which is a continuation of application Ser. No. 07/704,766, filed May 23, 1991, now abandoned.

BACKGROUND OF THE INVENTION

1. Field of the Invention

This invention relates to neural network computer architectures and specifically to a method of using a neural network to initialize inputs to complex processes so as to produce a target process output.

2. Background Art

Neural networks are computing devices inspired by biological models and distinguished from other computing devices by an architecture which employs a number of highly interconnected elemental "neurons". Each neuron is comprised of a summing junction for: receiving signals from other neurons, for weighting each signal by a weighting value, and for summing them together. The summing junction is ordinarily followed by a compressor or "squashing" function (typically a logistic curve) that compresses the output from the summing junction into a predetermined range, ordinarily from zero to one. The neuron's inputs are those inputs to the summing junction and the neuron's output, termed an "activation", is the output from the compressor.

The inputs of each neuron may be connected to the outputs of many other neurons and the neuron's activation may be connected, in turn, to the inputs of still other neurons. In a "feedforward" neural net architecture, inputs to the network are received by a first layer of neurons whose activations feed the inputs of a second layer of neurons and so on, for as many layers as desired. The final layer provides the output of the network.

In a "recurrent" neural network architecture, inputs are received by a single layer of neurons and the activations of those neurons are fed back as inputs to that single layer to produce new activations during a "propagation".

Both types of neural network architectures may be realized through programs running on conventional yon Neuman architecture digital computers. Alternatively, neural networks may be constructed with dedicated analog or digital circuitry; for example, by using analog summing junctions and function generators to construct each neuron, as is generally understood in the art.

In operation, the neural network receives an input or a set of inputs and produces an output or a set of outputs dependent on the inputs and on the weighting values assigned to each neuron's inputs. With the appropriate selection of the weighting values, a variety of computational processes may be performed.

The relationship between the weighting values and the computational process is extremely complex and the weighting values are ordinarily determined by a teaching procedure. With the teaching procedure, a teaching set of corresponding inputs and target outputs are presented to the neural network and error values which are used to modify an initial set of weighting values are generated. This process is repeated until the generated error values are acceptably low, at which point the weighting values may be fixed.

Although the teaching method of programming neural networks appears cumbersome when compared with the programming of a conventional yon Neuman computer-because many inputs and outputs must be presented in teaching the neural network-the advantage to the teaching method of programming is that the mechanics of the computational process need not be understood. This makes neural network computers ideal for use in modeling applications where inputs and outputs are available, but the underlying mathematical process is not known.

One particular modeling application for which neural networks may be useful is that of modeling a complex industrial process. Specifically, a manufacturing process may have a number of inputs, and an output that is ultimately a finished product or product component. As an example, the process may be the injection molding of plastic. In this case the inputs might be the mold temperatures and the pressure and speed with which the plastic is injected. The outputs might be the measured qualities of the product, such as dimensions, surface finish, or strength, for example.

During normal operation of the manufacturing process, the inputs and outputs are related to each other in a complex but stable manner, dictated by the physics of the process. A neural network may be taught this relationship by using actual but historical input and output values of the manufacturing process for teaching.

In one application of a neural network, after the neural network has been taught, it is presented with trial inputs and the resulting trial outputs are examined to verify whether the desired product qualities will be produced with those trial inputs. Trial and error may be used to verify the required process inputs with the trained neural network without the waste and expense that may be involved in performing the same tests with the actual process.

Unfortunately, the trial and error procedure is difficult and time-consuming. Further, for multivariable nonlinear processes, where the adjustments of the input values is a complex function of the error between the target output and the trial output, trial and error techniques may fail altogether because the error provides virtually no indication of the next set of inputs to try.

SUMMARY OF THE INVENTION

The present invention provides a method of using a neural network, trained to a complex process, to produce a set of input values for that process, that will produce a target set of outputs of that process. Specifically, the network is trained to the process using an historical teaching set of corresponding inputs and outputs of the process. This teaching establishes the weights of the interconnections between the neurons of the neural network. A trial input is then presented to the network and this input is forward-propagated to produce an output value. The difference between the output of the network and the target output is back-propagated to compute an input error value for the input neurons of the network, and this input error value is used to modify the trial input to be closer to the desired input.

Accordingly, it is one object of the invention to eliminate the need for a trial and error methodology to determine optimal input values to a process. This is especially important in complex multivariable processes where the error in the output may provide very little indication of which inputs need to be modified, and in which direction the modification should be made. The back-propagation of the output error value in the neural network provides an indication of the modification needed to each of the values of the trial input.

The process of forward-propagating a trial input, back-propagating an output error value, and modifying the trial input may be repeated and the error between the network output and the target output monitored.

It is thus another object of the invention to provide an iterative means for correcting a trial input to be arbitrarily close to the input value needed to achieve the target output.

Other objects and advantages besides those discussed above shall be apparent to those experienced in the art from the description of a preferred embodiment of the invention which follows. In the description, reference is made to the accompanying drawings, which form a part hereof, and which illustrate one example of the invention. Such example, however, is not exhaustive of the various alternative forms of the invention, and therefore reference is made to the claims which follow the description for determining the scope of the invention.

DETAILED DESCRIPTION OF THE PREFERRED EMBODIMENT

Figure 1:
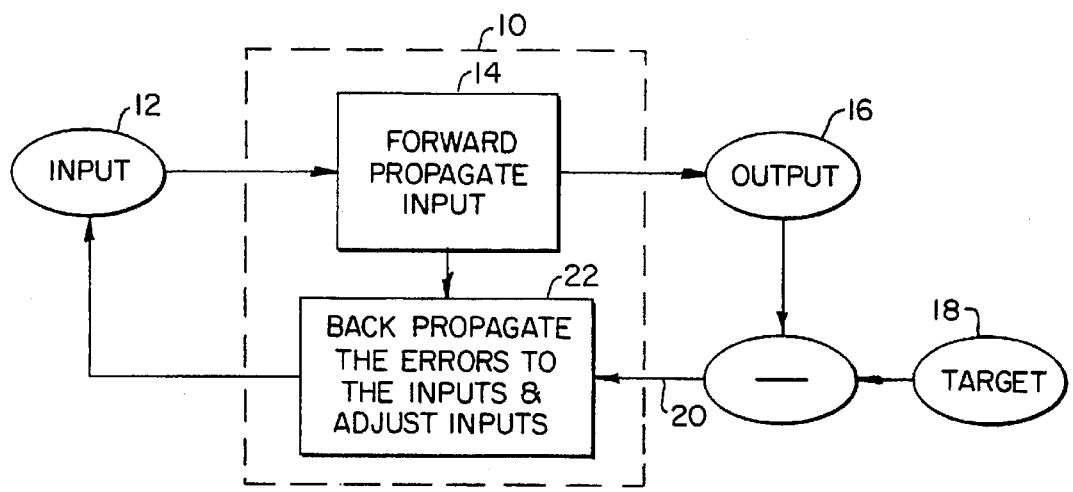
FIG. 1 is a block diagram showing the use of a neural network in the method of the present invention.

Referring to FIG. 1, the present invention provides a method of selecting input values for a complex process to produce a desired, target output. The method employs a neural network 10 trained to the complex process, as will be described. A trial input 12 is provided to the neural network 10, and that input 12 is forward-propagated, as indicated by block 14, by the neural network 10, to produce a trial output 16. This trial output 16 is compared to a target output 18 to create an output error value 20 which is back-propagated, as shown by process block 22, and the back-propagated error is used to modify the trial input 10. The modified trial input 10 is then forward-propagated again and the process described above is repeated until the output error value 20 is reduced below a predetermined minimum. Each of these steps will be described in further detail below.

TRAINING THE NETWORK TO A COMPLEX PROCESS

Collecting a Teaching Set

Figure 2:
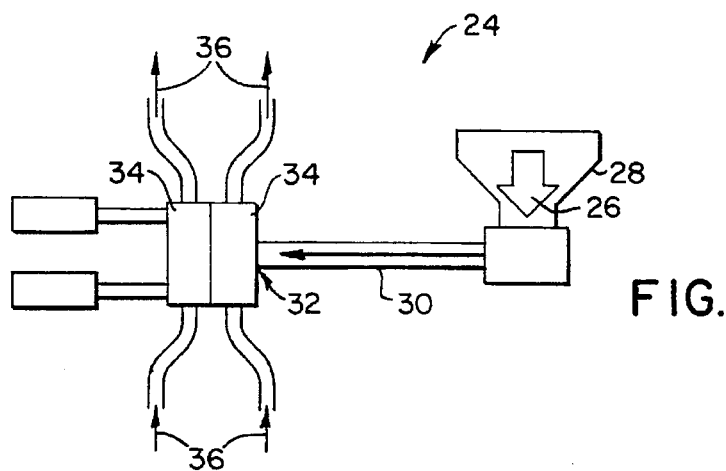
FIG. 2 is a schematic representation of an injection molding machine as may be modeled by a neural network of FIG. 1 according to the present invention.

Referring to FIG. 2, the neural network 10 may be trained to model a complex multi-input process, such as injection molding, on an injection molding machine 24. It will be recognized that injection molding is merely illustrative of one of the many processes to which the present invention may be applicable.

In injection molding, a thermoplastic material 26, usually in the form of pellets, is received into a hopper 28 and fed from the hopper into an injection barrel 30 by means of an auger (not shown) within that barrel 30. The rotation of the auger within the barrel 30 "plasticates" or melts the thermoplastic material 26 and forces the thermoplastic material 26 toward a nozzle 32 on one end of the barrel 30 abutting a mold 34. After a sufficient amount of melted thermoplastic material 26 has entered barrel 30, the auger ceases rotation and is used as a ram to inject the molten thermoplastic material 26 into the mold 34. The speed and pressure of the injection may be controlled. After the mold 34 has filled, the auger stops and the thermoplastic material 26 is allowed to cool momentarily in the mold 34. The temperature of the mold 34 may be controlled by means of flowing coolant 36. Finally, the mold halves are separated and a finished part of the molded thermoplastic material (not shown) is ejected.

Figure 3:
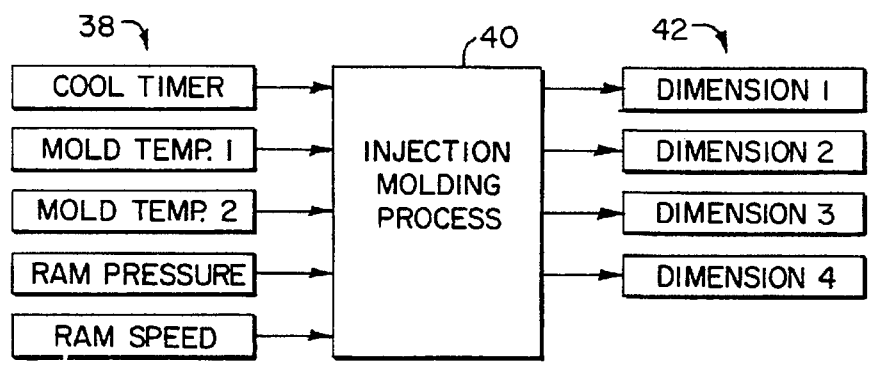
FIG. 3 is a block diagram of the process inputs and process outputs of the injection molding machine of FIG. 2.

Referring to FIG. 3, the quality of the part, and in particular, the dimensional accuracy of the part, will depend on the process of inputs 38 to the injection molding process 40, including: the injection speed and pressure, the temperature of the mold halves, and the time allowed for the part to cool. The quality of the part may be quantified by process outputs 42 from the injection molding process 40, the process outputs 42 being part dimensions, for example.

It will be understood that other process inputs, such as plastic type and dryness, for example, and other process outputs, such as surface finish, might be used instead, and that the process inputs 38 and outputs 42 are provided only by way of example.

Figure 4:
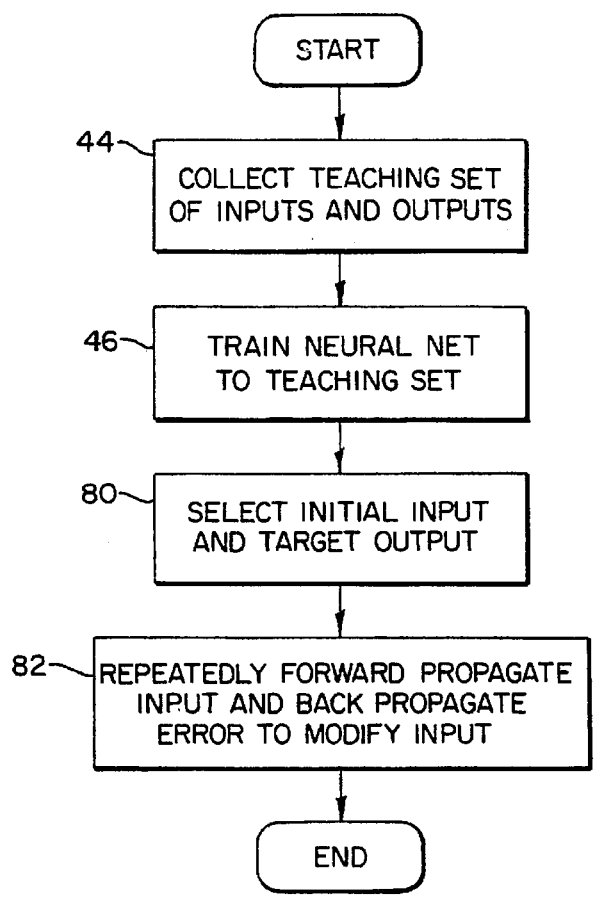
FIG. 4 is a flow chart showing generally the method of FIG. 1.

Referring to FIG. 4, in preparation for teaching the neural network 10 (of FIG. 1) to emulate the injection molding process 40 (of FIG. 3), a teaching set is collected, per process block 44, the teaching set comprising of a number of elements, each element including a different process input 38 and its corresponding process output 42. Each process input 38 and process output 42 will, in turn, be comprised of a number of input and output values, as has been described. In the examples of FIGS. 2 and 3, the teaching set is established from the process inputs 38 and outputs 42 by repeatedly molding parts with the injection molding machine 24 under a variety of different process inputs 38. The input setting become the teaching inputs ti(n,i) and the measurements of the resulting parts become the corresponding teaching outputs to(n,i). In the teaching inputs ti(n,i) and teaching outputs to(n,i) n is an index referring to the element of the teaching set derived from a particular part molding and i is an index of the input and output values of that element.

The values of the elements of the teaching set are "normalized" to a range of between 0 and 1 for computational convenience by an appropriate scaling and offset factor.

As shown by process block 46, the neural network 10 is trained to this teaching set so as to be able to emulate the injection molding process 40. The training of a neural network 10 to a teaching set, as will be described, is generally understood in the art and as described in detail below, and also in "Parallel Distributed Processing: Explorations in the Microstructure of Cognition" Vol. 1 and 2 by David Rumethart et al. MIT Press, 1989, hereby incorporated by reference.

A Feedforward Neural Network

Figure 5:
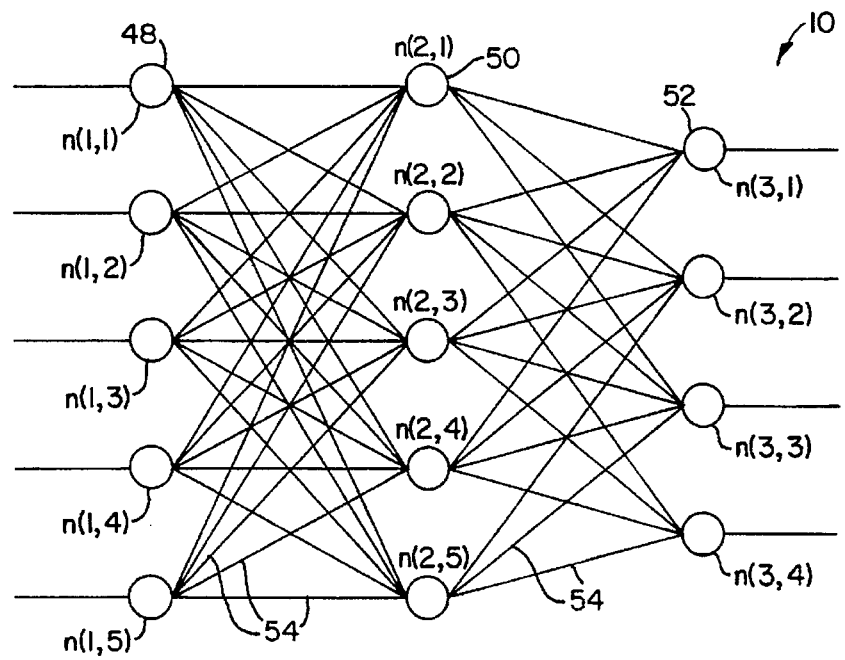
FIG. 5 is a schematic representation of a feedforward neural network suitable for practice of the method of FIGS. 1 and 4.

Referring to FIG. 5, an feed-forward neural net 10 suitable for training with the above described training set, has three columns of neurons 48–52 divided, by column, among input neurons 48, output neurons 52, and hidden neurons 50. For simplicity, the illustrated feedforward neural network 10 is comprised of five input neurons 48, five hidden neurons 50, and four output neurons 52. However, it will be understood from the following discussion that the method of the present invention is applicable generally to neural networks with different numbers of neurons and layers.

Each neuron of layers 48 and 50 is connected to the succeeding layer along a multitude of interconnections 54 thus forming the "network" of the neural network 10. The neurons 48–52 may be conveniently identified by their layer and their number within that layer, where input neurons 48 form the first layer and output neurons 52 form the last layer. A given neuron may be thus identified as n(k,i) where k is a layer number from 1 to $n_k$, $n_k$ is the maximum number of layers, i is the number of the neuron within that layer from 1 to $n_i$, and $n_i$ is the last neuron in that layer.

The input neurons 48 are simply points at which the neural network 10 receives an input, and thus have only a single input and a single output equal to that input. The hidden and output neurons 50 and 52, on the other hand, have multiple inputs and an outputs that derive from a combination of these inputs. The output neurons 52 provide the output values of the neural network 10.

During the operation of the neural network 10, signals are transmitted between layers of neurons along the interconnections 54. Associated with each interconnection, 54 is a weight which scales the signal transmitted on that interconnection according to the weight's value. The weights may be identified by the identification of the neurons 48–50 flanking the interconnection 54 so that a given weight will be designated as w(k,i,j) where k and i are the layer and number of the neuron 48–52 receiving the signal along the interconnection 54 and j is the number of the neuron 48–52 transmitting the signal along the interconnection 54. The layer of the neuron 48–52 transmitting along the interconnection 54 will be apparent from context.

Forward-Propagation

Figure 6:
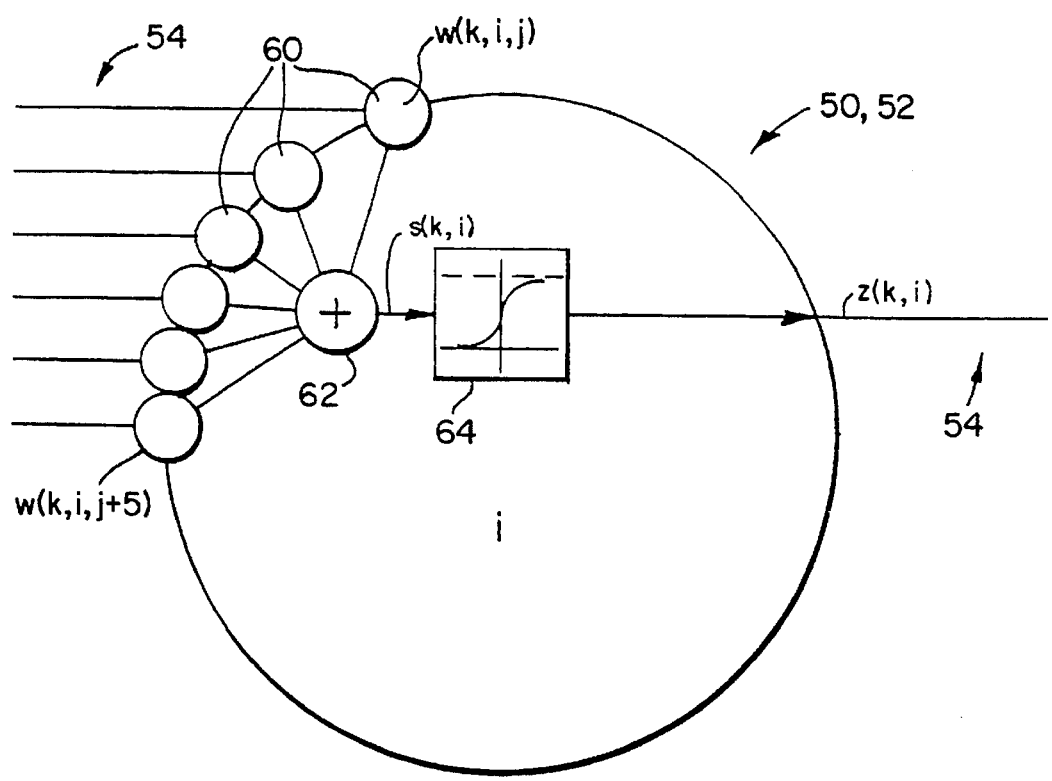
FIG. 6 is a detailed schematic representation of a single neuron of the neural network of FIG. 5 showing the operation of the neuron during forward-propagation.
Figure 7:
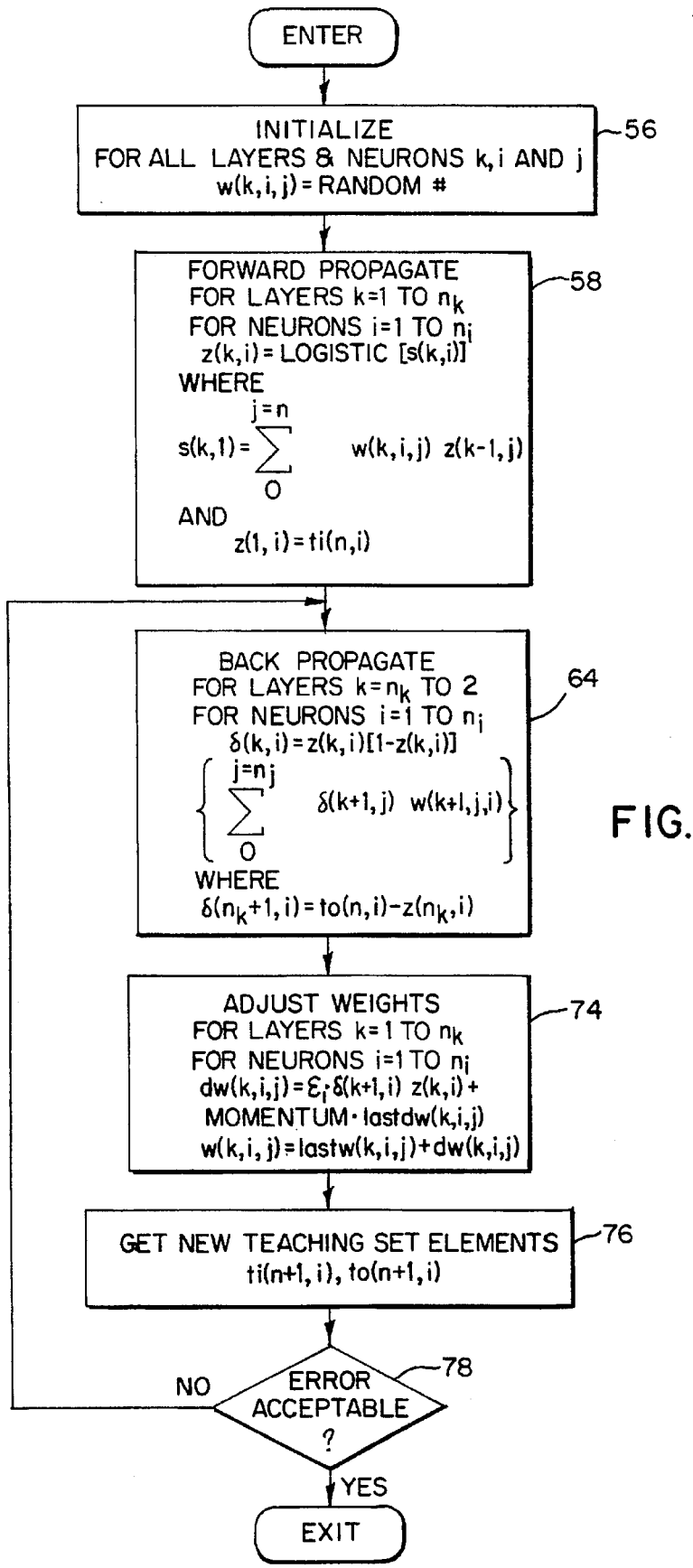
FIG. 7 is a detailed flow chart of the training step shown in the FIGS. 4 and 6.

Referring to FIGS. 5, 6 and 7, the first step in teaching the neural network 10 is initializing each of the weights w(k,i,j) of the network 10 to a random value between 0 and 1, as shown by process block 56 of FIG. 7. The weights w(k,i,j) will be modified during the learning process and embody the "learning" of the process. Thus, this randomization is akin to "erasing" the neural network 10 prior to learning.

The second step, as shown by process block 58 of FIG. 7, is the forward-propagation of an input ti(n,i) from the teaching set through the network 10. The input values of the first element of the teaching set, as normalized, are presented to the input neurons 48 and these values forward-propagated through each of the layers as activation values z(k,i) associated with each neuron n(k,i). For example, referring to FIG. 6, the first layer of hidden neurons 50, after the input neurons 48, will receive the output of each input neuron 48 along an interconnection 54 at an input node 60. Each input node 60 scales the signal along its associated interconnection 54 by the weight w(k,i,j) for that interconnection 54.

The weighted inputs from these input nodes 60 are then summed together at a summing junction 62 and the resulting sum, s(k,i), (for neuron n(k,i)) is compressed to a value between 1 and zero by a logistic-based compressor 64 or other compressing function as is known in the art. This compressed sum becomes the activation value z(k,i) from the neuron n(k,i).

Specifically, the activation z(k,i) of each neuron 50 and 52 is determined according to the following formula:

$$z(k,i) = logistic\ (s(k,i)) \qquad (1)$$

where:

$$s(k,i) = \sum_{}^{j} w(k,i,j) * z(k-1,j) \qquad (2)$$

and $$logistic(s(k,i)) = \frac{1}{1 + e^{-s(k,i)}} \qquad (3)$$

In equation (2), j is an index variable ranging from 1 to $n_i$ for the previous layer and where z(1,i) is the teaching input ti(n,i) associated with that input neuron n(1,i) and a teaching set element n.

This forward-propagation process is repeated for each of the layers until the activations $z(n_k,i)$ for the output neurons 52 are determined for that teaching input ti(n,i). The activations $z(n_k,i)$ of the output neurons 52 are the outputs of the network 10.

Forward-propagation may be thought of as the normal operating mode of the neural network 10. An input is provided to the network 10 and an output is produced by forward-propagation analogous to the output of a conventional von Neuman computer. The "program" run by a neural network computer 10 is effectively the values of its weights w(k,i,j).

When a neural network 10 is used to simulate a physical process, the weights w(k,i,j) hold the mechanical properties of the process or its "physics", and the activations z(k,i) hold the present state of the process within its cycle. The determination of the proper weights, w(k,i,j) for the neural network 10, then, is key to using the neural network 10 to model a particular process.

Back-Propagation

Determining the values of the weights w(k,i,j) so that the neural network 10 may model a particular process involves repeatedly forward-propagating the input values of the teaching set and back-propagating the error between the output of the neural network 10 and the output values of the teaching set. Referring to FIGS. 5, 7, 8 and 9, the back-propagation process, shown as process block 64 of FIG. 7, determines an error value δ(k,i) for each neuron 50–52 starting at the last layer $n_k$.

Figure 8:
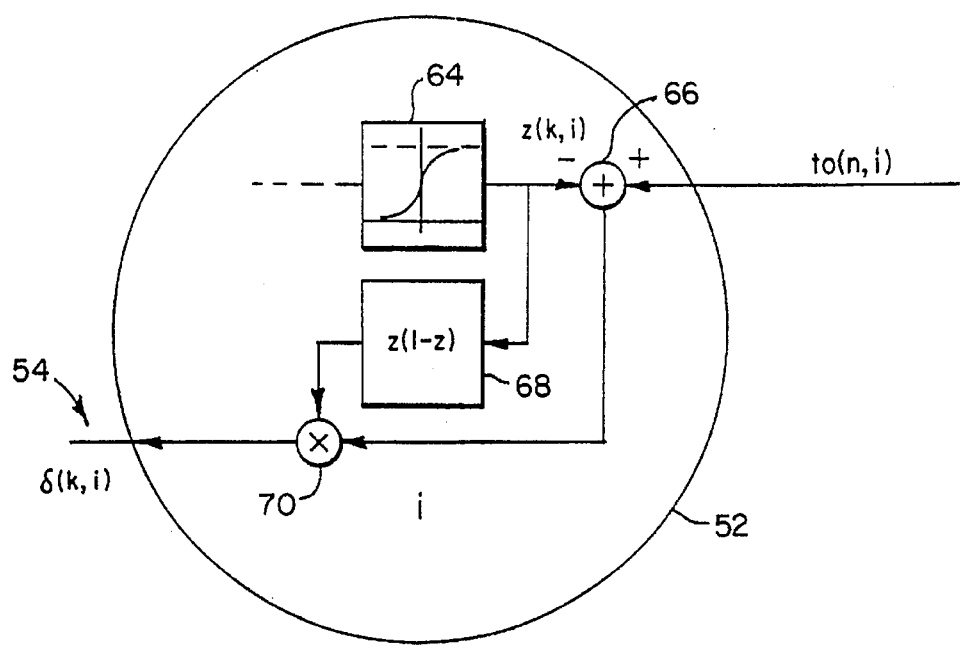
FIG. 8 is a detailed schematic representation of a single neuron in the last layer of the neural network of FIG. 5 showing the operation of the neuron during back-propagation.

As shown in FIG. 8, the activation at each output neuron 52 is subtracted from the teaching set output, to(n,i), associated with that output neuron $n(n_k,i)$ at summing junction 66. This difference δ($n_k$, i), termed the "output error value" is multiplied by a function 68 of the activation $z(n_k,1)$ of that neuron, as will be described below, by scaling junction 70. The output error value δ($n_k$,i) from each output neuron 52 is then transmitted to the previous layer of neurons 50 along interconnections 54.

Figure 9:
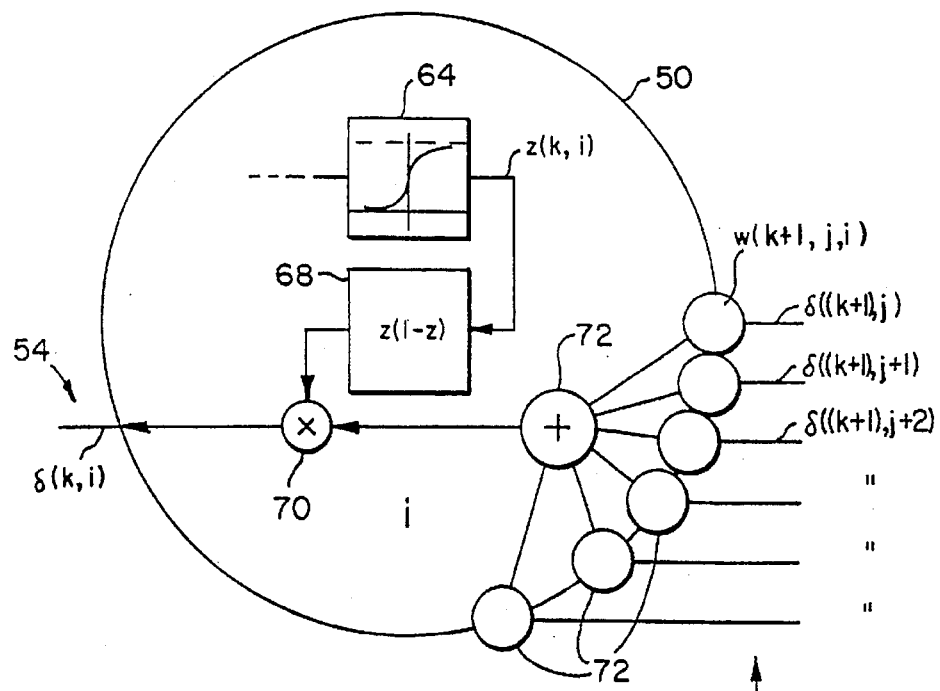
FIG. 9 is a detailed schematic representation of a single neuron not in the last layer of the neural network of FIG. 5 showing the operation of neuron during back-propagation.

Referring to FIG. 9, these output error values δ($n_k$,i) from the output neurons 52 are received by the preceding layer of hidden neurons 50, where they are weighted at input nodes 72 by the same weights w(k,i,j) as used in the forward-propagation along those particular interconnections 54. The weighted output error values are then summed at summing junction 72, and multiplied by function 68 of the activation of that neuron by scaling junction 70 to produce the error value $\delta(n_k,i)$ for that neuron. This process is repeated for each hidden layer 50 until the errors $\delta(k,i)$ have been computed for each neuron layer up to the input neurons 40.

Specifically, error values $\delta(k,i)$ are computed for each layer as given by the following formula:

$$\delta(k,i) = z' \sum^{j} \delta(k+1,j)w(k+1,j,i) \qquad (4a)$$

where z' is function 68 and is the derivative of the squashing function 64 with respect to s(k,i) for the neurons of layers 50 and 52. In the preferred embodiment, the squashing function z(k,i) is the logistic described in equation (3) whose derivative z' is the computationally convenient z(k,i) (1-z(k,i)) and thus equation (4a) becomes:

$$\delta(k,i) = z(k,i)(1 - z(k,i)) \sum^{j} \delta(k+1,j)w(k+1,j,i) \qquad (4b)$$

where $\delta(n_k,i)$ is the output error value, i.e., the difference between the output value of the teaching set to (n,i) and the activation $z(n_k,i)$. Once the error values $\delta(k,i)$ for each of the layers 2 to nk and each of the neurons 1 to $n_i$ is determined, the weights w(k,i,j) are adjusted per process block 74 of FIG. 7.

Weight Adjustment

The error values $\delta(k,i)$ are used to modify the weights w(k,i,j), and through many repetitions of this forward and back-propagation with different elements n of the teaching set, the network 10 is taught, by modification of its weights, to respond as the process 40 would respond.

The modification of the weights, per process block 74 of FIG. 7, is performed by determining a correction value dw for each weight for each interconnection 54 according to the following formula.

$$dw(k,i,j)=\delta\epsilon(k+1,i)z(k,j)+(momentum)\ lastdw(k,i,j) \qquad (5)$$

where lastdw is the value of dw immediately after the previous modification of the weights.

The new weight is determined by adjusting the previous weight value by the corresponding value of dw or $$w(k,i,j)=lastw(k,i,j)+dw(k,i,j) \qquad (6)$$

where lastw(k,i,j) is the weight value w(k,i,j) immediately after the previous modification of the weights.

The factor $\epsilon$ in equation 5 is a learning rate and along with momentum, another factor, adjusts how fast the weights are modified. Preferably, $\epsilon$ and momentum are less than one and in one embodiment may be 0.1 and 0.95 respectively.

As is shown in process block 76, new teaching set inputs ti(n+1,i) and outputs to(n+1,i) are obtained. If the last element of the teaching inputs has been used, the teaching set index n is set to zero and the teaching set elements are repeated.

At process block 78, errors $\delta(n_k,i)$ previously obtained in preparation to back-propagation, are checked to see if the network 10 has been taught sufficiently. Preferably the square of the errors $\delta(n_k,i)$ is summed over all the output neurons for all the teaching set elements n. If this error is below a predetermined value, the teaching process is done; if not, process blocks 64–76 are repeated.

When the teaching is complete, the weights w(k,i,j) are saved for use in optimizing an input to a target output as will now be described.

Optimizing an Input to a Target Output

Referring again to FIGS. 2 and 4, once the network 10 has been trained to the particular process, such as the injection molding process 40, the network 10 may be used to deduce the proper inputs to the process, such as the process inputs to the injection molding machine 24, given a desired output target value tg(i). This output target value tg(i) is determined by the user and is dependent on the desired characteristics of the product.

An arbitrary trial input value tr(i) is presented to the inputs of the neural network 10 per process block 80 of FIG. 4. The trial input may be a random input, within the normalization range of 0 and 1 described above, or may be any non-optimal input value presently in practice. The trial input, tr(i), is then modified, per process block 82, using the trained network 10 as will be described below.

Figure 10:
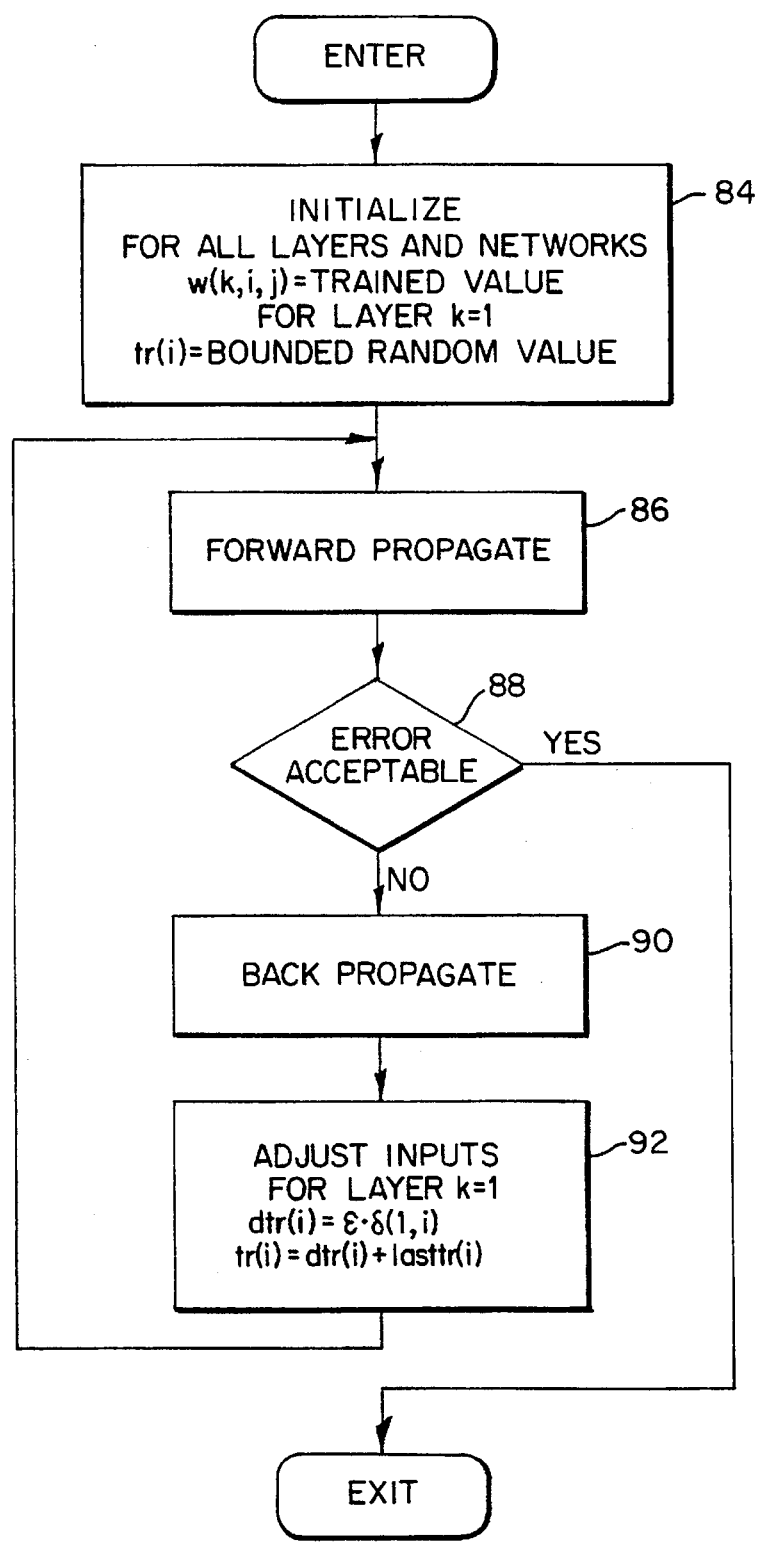
FIG. 10 is a detailed flow chart of the input modifying step of FIG. 4.

Referring to FIG. 10, the optimization process begins, per process block 84 with an initialization of the network. First, the weights of the networks w(k,i,j) are set to those values previously determined by the training process of process blocks 56–76 shown in FIG. 7. Second, the trial input is presented to the input of the network 10.

In process block 86, the trial input tr(i) is forward-propagated through the network 10 to produce a trial output $z(n_k,i)$ in a manner identical to that of process block 58 of FIG. 7. An error value for the output neurons 52 is determined per equation (4) above, using the target output tr(i) from which to subtract the activation $z(n_k,i)$.

At decision block 88 the error values $\delta(n_k,i)$ for each output neuron 52 are squared and summed and this sum compared to an error threshold to determine if the trial output $z(n_k,i)$ is acceptably close to the output error value. The error threshold is determined by the user and will depend on the requirements of the product. For example, in the injection molding process 40, the error threshold will be determined by the required dimensional accuracy of the parts.

If the error $\delta(n_k,i)$ is less than the error threshold; then process block 82 is exited and the trial input tr(i) becomes the indicated optimal input. On the other hand, as will be more typical for the first few iterations of the optimization process 82, if the error will be significant, the program will proceed to process block 90.

At process block 90, the output error values $\delta(n_k,i)$ are back-propagated for each neuron in a manner similar to that of process block 64 of FIG. 7 except that the back-propagation is performed for layers $k=n_k$ to 1 so as to include the input layer of neurons 48.

Trial Input Adjustment

At process block 92, the back-propagated error values $\delta(k,i)$ are used to modify not the weights w(k,i,j), as was done at process block 74 during the teaching process 46, but rather the trial input tr(i). The process of modifying the trial inputs tr(i) is analogous to the modification of the weights performed during the teaching process 46. That is, a correction value dtr is computed for each input neuron 48 according to the following formula:

$$dtr(i)=\epsilon'\delta(1,i) \qquad (7)$$

where $\delta(1,i)$ is the error value at the input neurons 48 and will be termed the "input error value".

The new trial input tr(i) is determined by adjusting the previous trial input tr(i) by the corresponding value of dtr or $$tr(i) = lasttr(i) + dtr(i) \qquad (8)$$

where lasttr(i) is the value of the trial input tr(i) immediately after the previous modification of the weights.

The factor $\epsilon'$ in equation 8 is a correction rate which adjusts how fast the trial input is modified. Preferably, $\epsilon'$ is less than one and may be 0.1.

Process blocks 86–92 are repeated until the desired error threshold is reached. At this point, the current trial input, tr(i) becomes the optimized input.

Figure 11:
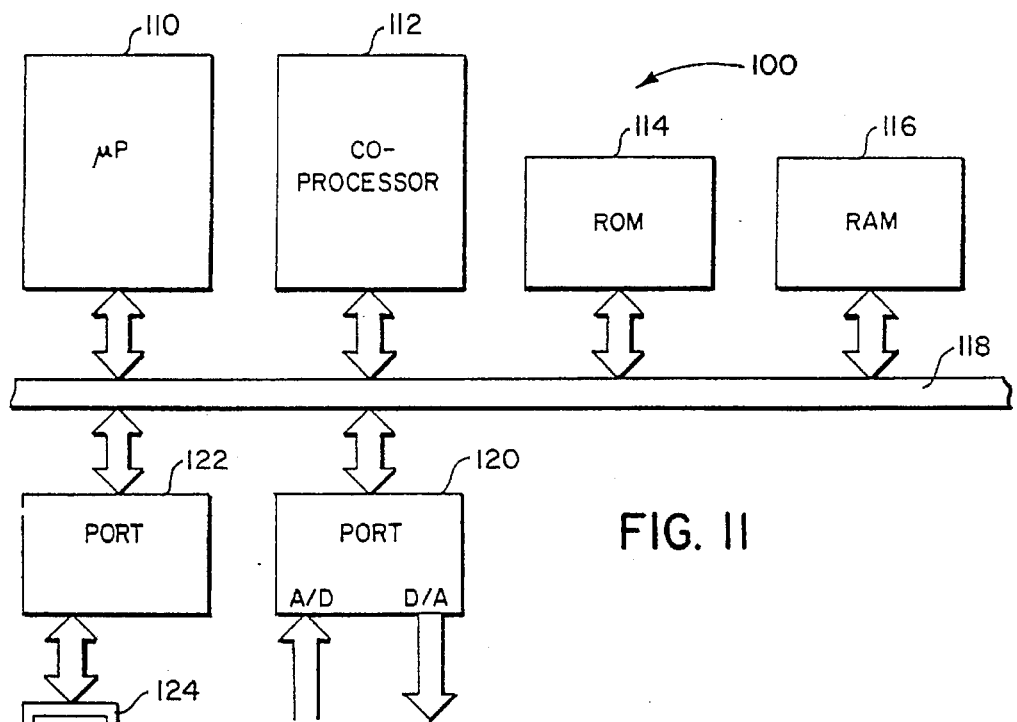
FIG. 11 is a schematic representation of a von Neuman architecture computer suitable for practice of the present invention.
Figure 12:
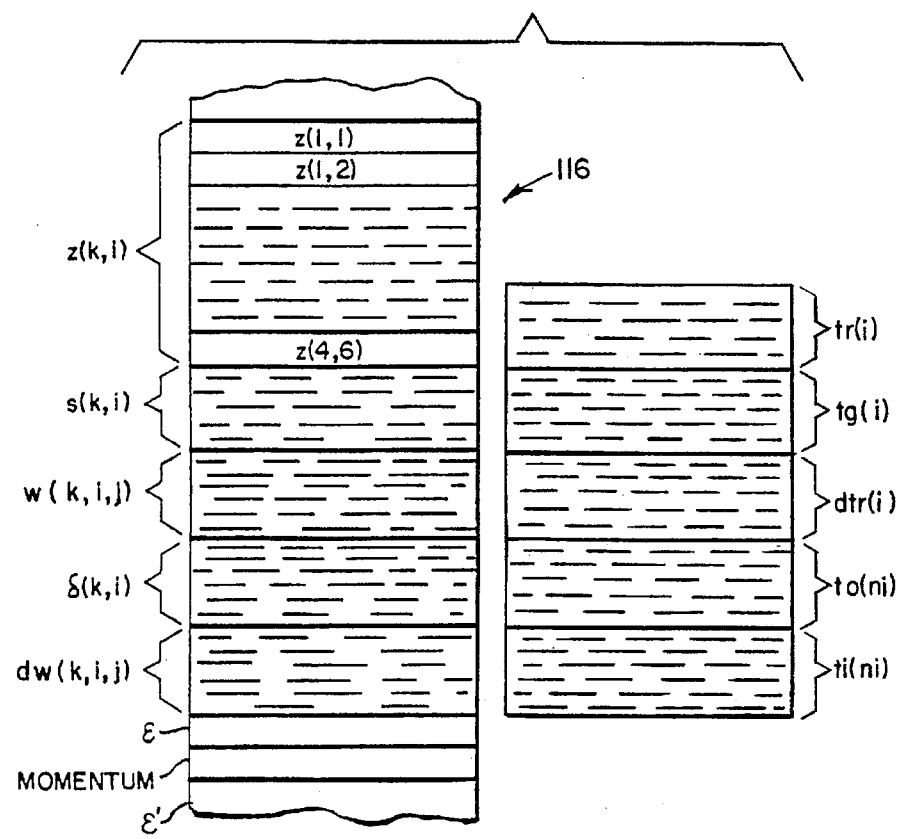
FIG. 12 is a schematic representation of the memory of the computer of FIG. 9 showing the storage of neuron states as memory values.

Referring to FIGS. 11 and 12, the operation of the neural network 10 is well adapted for realization on a conventional von Neuman digital computer 100. With such an implementation, the activations z(k,i) for each neuron 48–52 are held as stored values in computer memory and the weighting, summation and compression operations are simply mathematical subroutines performed by well understood computer hardware. In the preferred embodiment, the neural network and the teaching method to be described below are run on an IBM AT personal computer using the MSDOS operating system and running a program written in the Microsoft "C" computer language.

Referring particularly to FIG. 11, a schematic representation of a von Neuman architecture computer 100, well known in the art, is comprised of a microprocessor 110 connected through a high speed bus 118 to a co-processor 112 used to provide rapid arithmetic calculations for the neuron computations described above. Also connected to the bus 118 are a read only memory (ROM) 114 holding an operating system for the computer and a random access memory (RAM) 116 holding the neural network implementation program described above, as well as variables representing the states of the various inputs and outputs to the neurons. A port 122 attached to the bus 118 and communicating with the microprocessor 110 permits the input and output of data to and from a terminal 124 which is also used in programming the computer.

A second port 120 communicates with the microprocessor 10 via the bus 118 and includes an analog-to-digital converter and a digital-to-analog converter for interfacing the network 10 directly to the process being emulated to obtain a teaching set directly, for those circumstances where this direct interface is practical.

Referring to FIG. 12, the RAM 116 holds the values of the neurons' activations z(k,i) as described above in the form of a matrix variable in RAM 116, as is understood in the art. Similarly, the sums s(k,i), the weights w(k,i,j), the error values $\delta$(k,i), the values dw(k,i,j) and the values $\epsilon$ and momentum are stored in RAM 116. Also, RAM 116 holds the teaching inputs and outputs ti(n,i) and ti(n,i), the trial input value tr(i) and output target tr(i) and the correction value dtr(i) all referred to above.

The above description has been that of a preferred embodiment of the present invention. It will occur to those who practice the art that many modifications may be made without departing from the spirit and scope of the invention. For example, the above described optimization will work with other forms of neural networks other than the feed forward architecture described herein. In order to apprise the public of the various embodiments that may fall within the scope of the invention, the following claims are made.

We claim:

1. A method of determining an optimized input to produce a target output in a complex multi-input process, the process having a teaching set of historical inputs and outputs, the method using a neural network having input, hidden, and output neurons, each neuron having an activation and having weighted interconnections with other neurons, where the neural network has been trained according to the teaching set to establish the weights of the interconnections between neurons and to produce a trained neural network comprising the steps of:

a) presenting a trial input to the input neurons of the trained neural network;

b) forward-propagating the trial input to determine the activations of the output neurons of the trained neural network;

c) presenting the target output to the output neurons of the trained neural network;

d) back-propagating the difference between the activations of the output neurons and the target output to compute an input error value for the input neurons of the trained neural network;

e) adding a factor of the input error value to the trial input to create a modified trial input; and f) inputting the modified trial input to the complex multi-input process.

2. The method recited in claim 1 wherein at step (d) the input error value is also multiplied by a correction rate $\epsilon'$.

3. The method recited in claim 1 wherein the neural network is a feed forward network.

4. The method recited in claim 1 including the step of:

repeating steps (c) through (f) while the difference of step (d) is greater than a predetermined value.

5. An apparatus for optimizing a trial input to produce a target output in a complex multi-input process, the apparatus comprising:

a neural network having an input and output layer of neurons having activation and, for receiving the trial input at the input layer and forward-propagating the trial input to produce an output value at the output layer;

a comparing means communicating with the output layer for producing an output error value dependant on the difference between the output value and the target output;

the neural network also for receiving the output error value at the output layer and back-propagating the output error value to produce an input error value at the input layer; and a trial input means communicating with the input layer for scaling the trial input by adding a factor of the input error value to the trial input.

6. The apparatus recited in claim 5 wherein the modification means modifies the trial input, tr(i);

by adding a value dtr(i) to the trial input, where:

$dtr(i) = \epsilon'\delta(1,i)$ where $\epsilon'$ is a correction rate and $\delta(1,i)$ is the input error value.

* * * * *

UNITED STATES PATENT AND TRADEMARK OFFICE
CERTIFICATE OF CORRECTION

PATENT NO. : 5,671,335

DATED : September 23, 1997

INVENTOR(S) : Gerald W. Davis et al.

It is certified that error appears in the above-identified patent and that said Letters Patent is hereby corrected as shown below:

Col. 1, line 44,
Col. 2, line 1,
Col. 3, line 47,
Col. 6, line 35,
Col. 9, lines 14, 26,
"yon Neuman"                    Should be --von Neuman--.

Col. 5, line 6, "Rumethart"     Should be --Rumelhart--

Col. 8, line 32, "8"            Should be -- $\delta$

Signed and Sealed this

Tenth Day of February, 1998

*Attest:*

BRUCE LEHMAN

*Attesting Officer*   *Commissioner of Patents and Trademarks*